United States Patent Office.

HANS CHRISTIAN WILHELM HARMSEN, OF HAMBURG, GERMANY.

PROCESS OF RECOVERING TIN FROM TIN-SCRAP.

SPECIFICATION forming part of Letters Patent No. 463,112, dated November 10, 1891.

Application filed February 7, 1891. Serial No. 380,703. (No specimens.)

*To all whom it may concern:*

Be it known that I, HANS CHRISTIAN WILHELM HARMSEN, of Hamburg, in the Free State of Hamburg and German Empire, have invented a new and useful method of recovering tin from tin-scrap by heating it with the liquid nitrate of potash or soda, of which the following is a specification.

This invention relates to a new method of untinning the waste of tin plates by heating it with the liquid nitrate of potash or soda. When metallic tin is molten with nitrate of the alkaline metal, the results are, according to the height of temperature, either non-oxide or oxide of tin and nitrate of potassium or sodium, respectively, after the formula

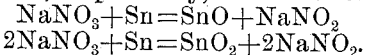

When the latter reaction takes place at red heat, it partially results in stannate of sodium and the escape of nitrous acid.

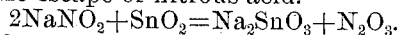

It is therefore advisable to conduct the melting at the lowest possible temperature, (about 400° centigrade.)

While this process has no advantage over that used in industry, (melting of saltpeter with lead,) it is of great advantage for separating the tin from waste-tin plates, as melting saltpeter has no effect on metallic iron.

It is impossible to separate the tin by heating the waste with a quantity of saltpeter corresponding to the quantity of the tin to be separated, as the wash would not, on account of its volume, come sufficiently into contact with the saltpeter. The following method, however, is very advantageous: In a semi-globular vessel capable of containing about one thousand liters and provided with exits, one thousand kilos of nitrate of sodium or potassium are molten to a very liquid fluid. A basket of riveted flat iron containing the tinned waste is then inserted into the vessel, where it is moved up and down by any suitable mechanical device. As soon as the tin has been completely oxidized, the basket is lifted out of the vessel by a pulley and its contents are thrown into a horizontal iron cylinder of about ten cubic meters containing two thousand liters of water. A fresh charge of waste is then brought into the melting-vessel, and this operation is repeated until the whole of the saltpeter has been changed into nitrite. The contents of the melting-vessel are then also thrown into the cylinder, and the water therein is brought to boiling temperature by means of steam introduced into the cylinder. The drum or cylinder is then closed by a man-hole trap and slowly rotated at about the rate of ten revolutions per minute, whereby the oxide of tin is completely separated from the iron. The solution of nitrite of potassium or sodium is then separated from the oxide of tin by filtration and afterward crystallized. The iron waste is then again rotated with water and the liquid produced is further utilized in the following operation: The mixture of oxide of tin is reduced by means of carbon to metallic tin in a furnace.

The great advantages of this process as compared with others are that the chemicals applied are not merely used up, but are changed into more valuable products, and that even the most rusty waste yields tin thoroughly free from iron.

What I claim, and desire to secure by Letters Patent of the United States, is—

The process of separating the tin from tinned waste, which consists in heating the same in molten nitrate of potassium or sodium, introducing the thus-oxidized tin into a cylinder or vessel containing waste and raising the latter to the boiling temperature by the introduction of steam therein, rotating the cylinder, and finally filtering or separating the solution of the nitrate of potassium or sodium from the oxide of tin, as set forth.

In witness whereof I have hereunto set my hand in presence of two witnesses.

HANS CHRISTIAN WILHELM HARMSEN.

Witnesses:
 C. J. PAUL BIENGRABER,
 PHILIPP BERTSCH.